United States Patent Office 2,758,265
Patented Aug. 7, 1956

2,758,265
SELENIUM RECTIFIERS

Charles Alexander Escoffery, Los Angeles, Calif., assignor to International Telephone and Telegraph Corporation, a corporation of Maryland No Drawing. Application August 29, 1951,
Serial No. 244,257

13 Claims. (Cl. 317—241)

This invention relates to improvements in selenium rectifiers, and more particularly to the introduction of a novel lacquer coating as a barrier layer between the selenium and counter-electrode layers of such rectifiers. By "lacquer" I refer broadly to a dispersion or solution of one or more chemical substances in a volatile solvent, these substances being capable of forming a film or coating upon volatilization of the solvent.

It is believed that the effective rectifying action of dry rectifiers, such as a selenium rectifier, largely depends upon the formation of a so-called barrier layer between the layer of selenium and the applied counter-electrode, the latter generally consisting of a cadmium-containing alloy. This barrier layer is greatly strengthened or enhanced by the "forming" of the rectifier, which process consists in applying a voltage to the same in the reverse, or poorly conducting direction for a period of time.

It has been found that the effective rectifying action of such selenium rectifiers can be improved by interposing an artificial barrier layer, for example, by the spraying of a lacquer on the selenium before the application of the counter-electrode. Lacquers for this purpose which have been proposed previously, have contained a wide variety of constituents, some of which have resulted in rectifiers of somewhat improved characteristics. The object of the present invention is to provide a new lacquer or coating for use as an artificial barrier layer, by means of which higher voltage discs can be obtained with a minimum number of rejects, and as a result of the use of which the forming time can be appreciably reduced in comparison with that necessary with rectifiers using known lacquers.

The new lacquer comprises as its essential ingredients a diamino benzene, i. e., a phenylenediamine, and a nitro alkyl, in the form of a solution, diluted or saturated, of about 1% to 2% of the diamino benzene in 98% to 99% of the nitro alkyl. For the latter, nitro-methane is preferably used. The amount of diamino benzene may be as low as 0.1% and still give an improved result, while up to approximately 4% diamino benzene is the maximum amount that will go in solution. The diamino benzene may consist of a compound selected from para-phenylenediamine, meta-phenylenediamine, N-methyl-para-phenylenediamine, and N-methyl meta-phenylenediamine. In the case of meta-phenylenediamine, if substitution is made in the ring, three possible compounds may be obtained: toluene-2,4-diamine, toluene-3,5-diamine and toluene-2,6-diamine. In the case of para-phenylenediamine, where substitution is made in the ring, only one unique compound is obtained: toluene-2,5-diamine.

In the preferred form of lacquer used, there is added to the essential ingredients above named, a film-forming material, such as cellulose nitrate. This carrier may be added to the lacquer in the form of a cellulose nitrate solution in an amount up to 10% of the latter. A preferred composition of the lacquer embodying such a carrier would be 1% of the diamino benzene, 1% of the cellulose nitrate solution, and 98% of the nitro alkyl.

While the specific composition of the cellulose nitrate solution forms no part of the present invention, the following has been found satisfactory for the purpose:

|  | Percent (dry basis) |
|---|---|
| Cellulose nitrate (nitrocellulose) type RS 5–6 | |
| Toluol | approximately 10.0 |
| Butyl alcohol | approximately 50.0 |
| Butyl acetate | approximately 15.0 |
| Ethyl acetate | approximately 15.0 |
|  | approximately 10.0 |
|  | 100.0 |

It will be appreciated that in the case where the cellulose nitrate solution is included in the lacquer, upon evaporation of the volatile portions thereof the cellulose nitrate remains as a film-forming material, and in the example given, this will then form approximately 0.1% of the lacquer as a whole.

By the use of the preferred form of lacquer mentioned above, substantially improved rectifiers have been obtained.

For example, it has been possible to easily manufacture 36-volt-rectifier cells or plates with a negligible rejection rate and with good forward conductivity. Furthermore, the forming time has been considerably reduced over the forming time required for rectifiers using lacquers or coatings known up to now.

While I have described above the principles of my invention in connection with specific apparatus, it is to be clearly understood that this description is made only by way of example and not as a limitation to the scope of my invention.

What is claimed:

1. In a rectifier having a base plate, a layer of selenium on the base plate, and a counter-electrode layer on the selenium, an intermediate layer between the selenium and the counter-electrode comprising a substance chosen from the group consisting of para-phenylenediamine, meta-phenylenediamine, N-methyl-para-phenylenediamine, and N-methyl-meta-phenylenediamine.

2. In a rectifier having a base plate, a layer of selenium on the base plate, and a counter-electrode layer on the selenium, an intermediate layer between the selenium and the counter-electrode consisting of 0.1% to 4% of a substance chosen from the group consisting of para-phenylenediamine, meta-phenylenediamine, N-methyl-para-phenylenediamine, and N-methyl-meta-phenylenediamine, not more than 1% but greater than zero percent of cellulose nitrate, and 96% to 99.9% of lower nitro-alkane.

3. A solution of a substance chosen from the group consisting of para-phenylenediamine, meta-phenylenediamine, N-methyl-para-phenylenediamine, and N-methyl-meta-phenylenediamine in a lower nitro-alkane.

4. A lacquer comprising 1% to 2% of a substance chosen from the group consisting of para-phenylenediamine, meta-phenylenediamine, N-methyl-para-phenylenediamine, and N-methyl-meta-phenylenediamine, not more than 1% but greater than zero percent of cellulose nitrate and 98 to 99% of lower nitro-alkane.

5. In a rectifier having a base plate, a layer of selenium on the base plate, and a counter-electrode layer on the selenium, an intermediate layer between the selenium and the counter-electrode consisting of 0.1% to 4% of a substance chosen from the group consisting of para-phenylenediamine, meta-phenylenediamine, N-methyl-para-phenylenediamine, and N-methyl-meta-phenylenediamine 96% to 99.9% nitro alkyl, said alkyl being selected from the lower alkyls.

6. A solution comprising 0.1% to 4% of a substance chosen from the group consisting of para-phenylenediamine, meta-phenylenediamine, N-methyl-para-phenylenediamine, and N-methyl-meta-phenylenediamine 96 to 99.9% nitro alkyl, said alkyl being selected from the lower alkyls.

7. In a rectifier according to claim 1, said intermediate layer consisting essentially of para-phenylenediamine.

8. In a rectifier according to claim 7 wherein said nitro alkyl is nitro methane.

9. In a rectifier having a base plate, a layer of selenium on the base plate, and a counter-electrode layer on the selenium, an intermediate layer between the selenium and the counter-electrode comprising a substance chosen from the group consisting of para-phenylenediamine, meta-phenylenediamine, N-methyl-para-phenylenediamine, and N-methyl-meta-phenylenediamine, said substance being deposited from a solution of said substance in a nitro alkyl, said alkyl being selected from the lower alkyls.

10. In a rectifier according to claim 9, said intermediate layer consisting essentially of para-phenylenediamine.

11. In a rectifier according to claim 2 wherein the diamino benzene is para-phenylenediamine.

12. A lacquer according to claim 4 wherein the diamino benzene is para-phenylenediamine.

13. A solution of para-phenylenediamine in nitromethane.

References Cited in the file of this patent

UNITED STATES PATENTS 2,229,617     Wampner     Jan. 21, 1941

OTHER REFERENCES

Simonds et al.: Handbook of Plastics (1943), page 248.